United States Patent
Yashiki et al.

(10) Patent No.: US 7,909,495 B2
(45) Date of Patent: Mar. 22, 2011

(54) VEHICLE HEADLIGHT HAVING COMPONENT INLAYING PORTIONS AND RADIATOR BODY

(75) Inventors: Satoru Yashiki, Shizuoka (JP); Hiromi Umehara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 240 days.

(21) Appl. No.: 12/108,618

(22) Filed: Apr. 24, 2008

(65) Prior Publication Data

US 2008/0266892 A1 Oct. 30, 2008

(30) Foreign Application Priority Data

Apr. 26, 2007 (JP) ................... 2007-116545

(51) Int. Cl.
*F21V 29/00* (2006.01)
*B60Q 1/04* (2006.01)

(52) U.S. Cl. .......................... 362/547; 362/546; 362/548

(58) Field of Classification Search .......... 362/546–547, 362/507, 487, 538–539, 549, 502, 263–265, 362/294, 373, 646, 649, 548

See application file for complete search history.

(56) References Cited

U.S. PATENT DOCUMENTS

| | | | | |
|---|---|---|---|---|
| 5,072,348 A * | 12/1991 | Tsukada | | 362/549 |
| 6,450,670 B1 * | 9/2002 | Strauss et al. | | 362/294 |
| 6,976,776 B2 * | 12/2005 | Kakidaira et al. | | 362/548 |
| 2002/0167818 A1 * | 11/2002 | Yoneima | | 362/547 |
| 2002/0167819 A1 * | 11/2002 | Yamaguchi et al. | | 362/547 |
| 2003/0058656 A1 * | 3/2003 | Yamaguchi | | 362/547 |
| 2005/0062393 A1 * | 3/2005 | Behr et al. | | 313/318.01 |

FOREIGN PATENT DOCUMENTS

JP 2001-243830 9/2001

* cited by examiner

*Primary Examiner* — Thomas M Sember
(74) *Attorney, Agent, or Firm* — Fish & Richardson, P.C.

(57) ABSTRACT

A vehicle headlight is arranged to prevent moisture from entering into a lighting circuit and a lighting space. A back cover has a cover main body 19 fitted into a fitting portion 5 of a lamp body 2 and made of resin material and connection terminals 20 embedded in the cover main body (except a part of the terminals) and made of metal material and in which the cover main body and the connection terminals are molded integrally. Component inlaying portions in which electronic components that constitute a lighting circuit of a discharge lamp and are connected electrically to the connection terminals are inlaid respectively are provided to the cover main body. A part of the connection terminals protruding from the cover main body is formed as connector terminal portions of a power supply connector for supplying power to the discharge lamp.

3 Claims, 7 Drawing Sheets

VEHICLE HEADLIGHT HAVING COMPONENT INLAYING PORTIONS AND RADIATOR BODY

TECHNICAL FIELD

The present disclosure relates to a vehicle headlight. More particularly, the present disclosure relates to the field of technology that prevents a moisture from entering into a lighting circuit and a lighting space by molding integrally a cover main body and connector terminals having connector terminal portions of a power supply connector. The application claims the benefit of priority of Japanese patent application no. 2007-116545 filed on Apr. 26, 2007, the disclosure of which is incorporated by reference herein.

BACKGROUND

There are some vehicle headlights in which a discharge lamp provided as a light source and a lighting circuit (ballast) for driving the discharge lamp are arranged in a lighting chamber having a front cover and a lamp body (see, e.g., Japanese Patent Document JP-A-2001-243830).

In the vehicle headlight disclosed in JP-A-2001-243830, a back cover, called a housing engaging portion, is fitted and secured to an opening portion in a rear end portion of a lamp body (lamp housing). A substrate on which a power supply connector and various electronic components are mounted is fitted to the rear surface side of the back cover.

A frame-like wall portion is provided at the rear end portion of the back cover, and cut grooves are formed on the wall portion. The substrate on which the power supply connector and the electronic components are mounted is fitted to the back cover such that the electronic components are arranged on the inner side of the wall portion, and the power supply connector is arranged in a state that such connector is inserted into the cut grooves.

However, in the vehicle headlight disclosed JP-A-2001-243830, the power supply connector such that it is inserted into the cut grooves formed on the rear end portion of the back cover. Therefore, moisture (steam) contained in an outer air or moisture existing on the outer side may enter into the vehicle lighting equipment through a clearance between the power supply connector and the cut grooves.

Moisture entering into the vehicle lighting equipment can negatively impact operation of the lighting circuit of the discharge lamp. Also, the moisture can cause flogging of the front cover in some cases.

SUMMARY

Therefore, the present disclosure relates to preventing moisture from entering into a lighting circuit and a lighting space.

In address the above problem, a back cover is provided for the vehicle headlight. The back cover has a cover main body fitted into the fitting portion of the lamp body and made of resin material. Connection terminals embedded in the cover main body (except a part of the terminals) are made of metal material. The cover main body and the connection terminals are molded integrally in the back cover. Component inlaying portions, in which electronic components that constitute a lighting circuit of the discharge lamp are connected electrically to the connection terminals are inlaid respectively, are provided to the cover main body. A part of the connection terminals protruding from the cover main body is formed as connector terminal portions of a power supply connector that supplies a power supply to the discharge lamp.

Therefore, the cover main body and the connector terminal embedded in the cover main body are tightly adhered.

Various aspects of the invention are set forth in the claims.

Some implementations result in the cover main body and the connection terminals buried in the cover main body being adhered tightly together. The moisture (steam) contained in an outer air or the moisture existing on the outer side is prevented from entering into the lighting circuit and the lighting chamber from the portion of the power supply connector. As a result, a malfunction of the lighting circuit of the discharge lamp can be prevented. Fogging of the front cover also can be prevented.

According to some implementations, a radiator body fitting portion is provided in the cover main body and an installing hole is formed to pass through longitudinally. Electronic circuit components that constitute the lighting circuit are mounted on a radiator body and arranged on a lighting chamber side. The radiator body is fitted to the radiator body fitting portion to close the installing hole. Therefore, improvement of a heat radiation property of the electronic circuit components can be achieved.

In some implementations, the radiator body is constructed by a heat radiating member made of metal material. A radiating insulating substrate is fitted to one surface of the heat radiating member. The electronic circuit components connected electrically to the connection terminals are mounted on the radiating insulating substrate. Therefore, improvement of a heat radiation property of the electronic circuit components can be achieved.

In some implementations, engaging projections are provided in the cover main body. An O ring is interposed between the cover main body and the fitting portion of the lamp body and is connected tightly to both members such that the back cover is fitted to the lamp body. The back cover is fitted to the lamp body by turning the cover main body in a direction, which intersects orthogonally with an opening direction of the fitting opening, to engage the projections with engaging portions provided on the lamp body. Sealing performance between the back cover and the fitting portion of the lamp body can be ensured by the O ring, and the moisture (steam) contained in an outer air or the moisture existing on the outer side can be prevented from entering into the lighting chamber. Also, since the back cover can be fitted to the lamp body by turning the back cover, attaching/detaching of the back cover can be accomplished easily when exchanging the discharge lamp.

DETAILED DESCRIPTION

An example of a vehicle headlight of the present invention will be explained with reference to the accompanying drawings hereinafter.

A vehicle headlight 1 is fitted and arranged to both right and left end portions, respectively, on a front end portion of a vehicle body.

Figure 1:
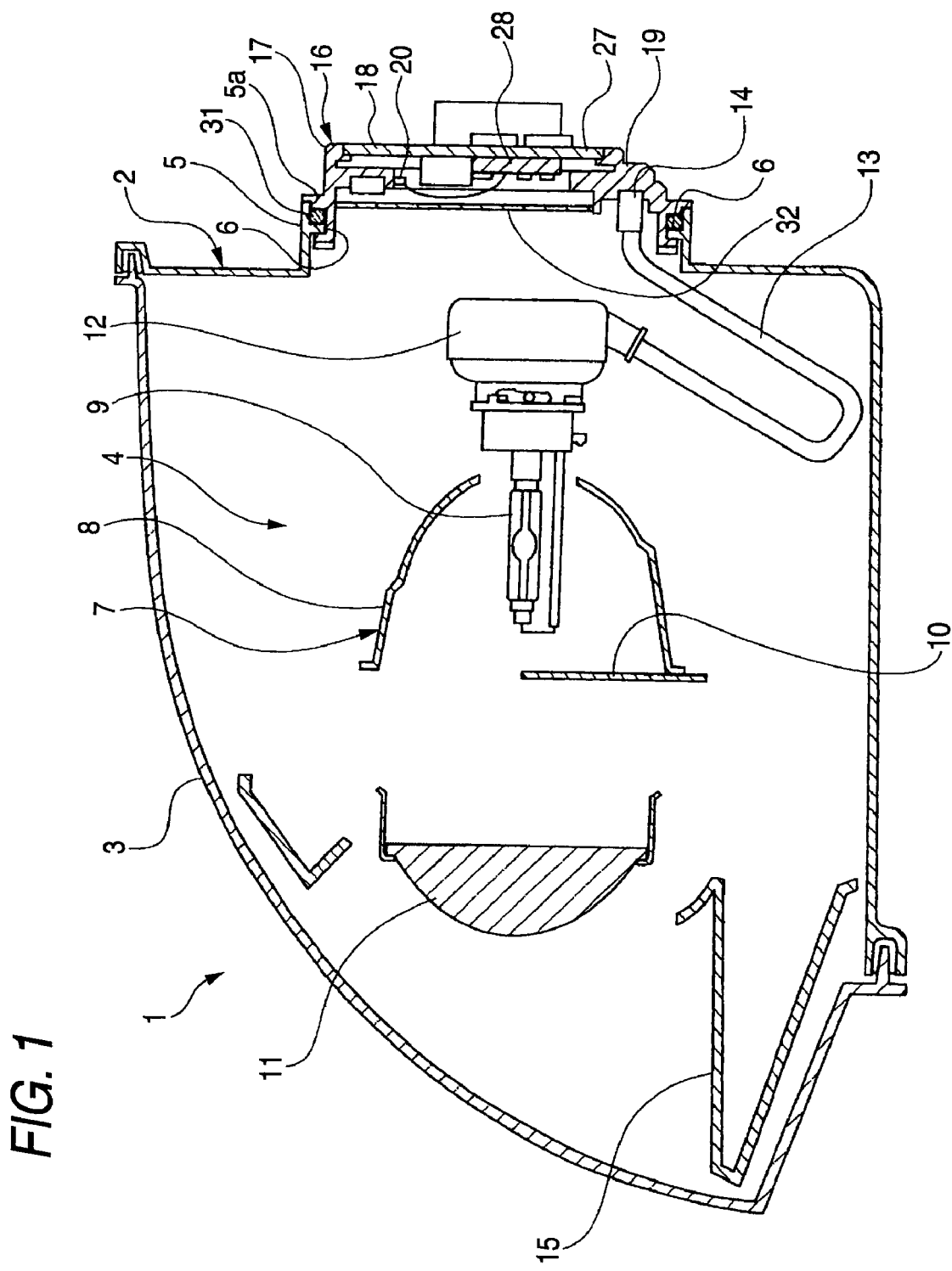
FIG. 1 is a schematic longitudinal sectional view of a vehicle headlight showing an example of the vehicle headlight of the present invention together with FIG. 2 to FIG. 7.

As shown in FIG. 1, the vehicle headlight 1 is equipped with a lamp body 2 having a recess portion that is opened forward and a front cover 3 for closing the front opening of the lamp body 2. Also, an inner space constructed by the lamp body 2 and the front cover 3 defines a lighting chamber 4.

Figure 2:
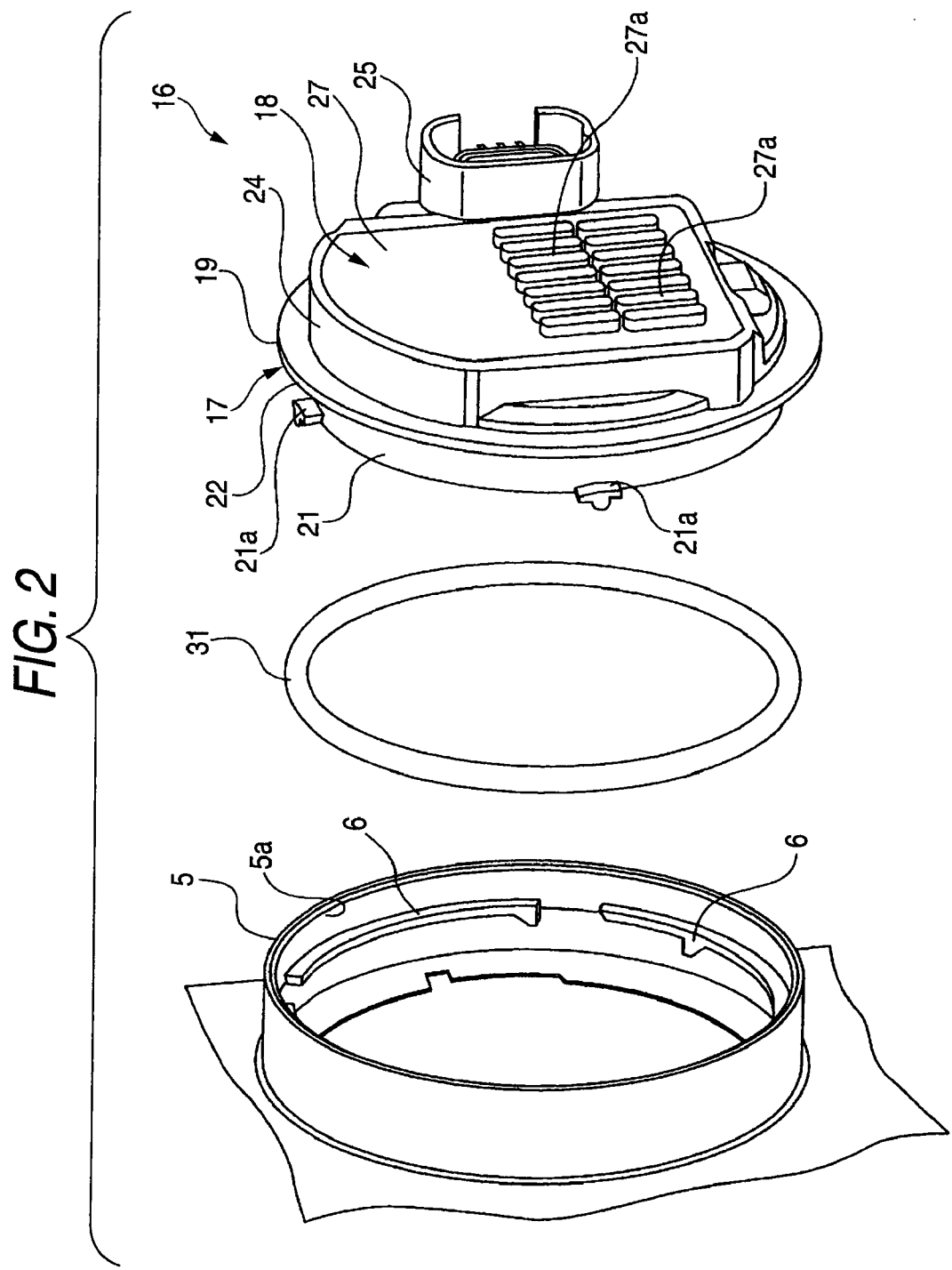
FIG. 2 is an exploded perspective view showing a fitting portion of a lamp body, an O ring and a back cover.

A fitting portion 5 in a substantially cylindrical shape is provided to the rear end portion of the lamp body 2 (see FIG. 2). The fitting portion 5 has a fitting opening 5*a* that is passed in the longitudinal direction. Engaging portions 6 are provided on the inner surface of the fitting portion 5. The engaging portions 6 are provided discretely in the circumferential direction, and each of the engaging portions 6 stretches inward from the inner surface of the fitting portion 5 and extends in the circumferential direction.

A lamp unit 7 is arranged in the lighting chamber 4 (see FIG. 1). The lamp unit 7 has a reflector 8, a discharge lamp 9 supported by the reflector 8, a shade 10 fitted to the reflector 8, and a lens 11 arranged in front of the discharge lamp 9.

A socket 12 is fitted to the rear end portion of the discharge lamp 9, and a starter 12*a* is arranged in the inside of the socket 12. A cable 13 extends from the socket 12, and a connector 14 is provided to an end portion of the cable 13 on the opposite side of the socket 12.

An extension 15 for closing a part of the lamp unit 7 is arranged in the lighting chamber 4.

Figure 3:
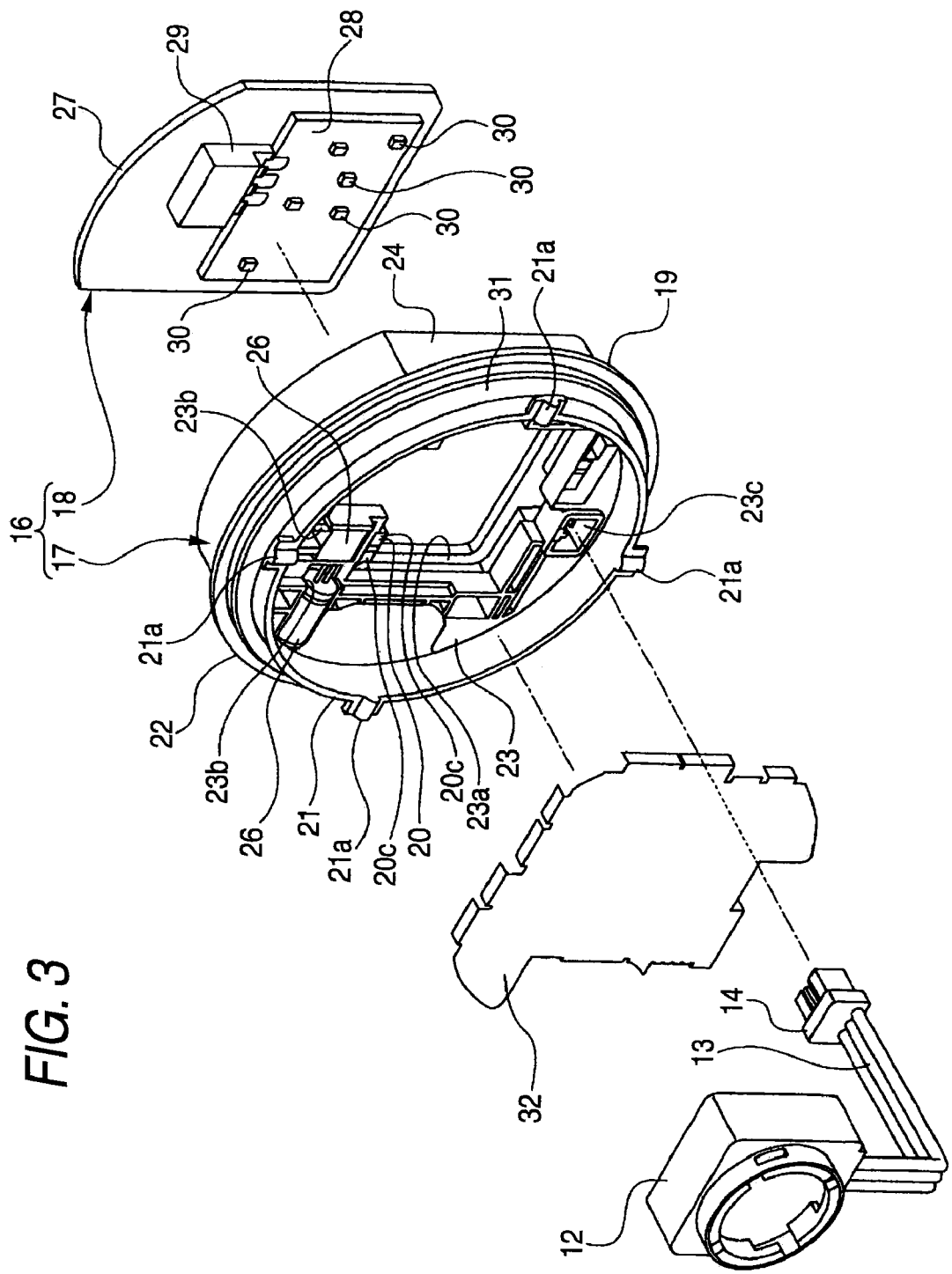
FIG. 3 is an exploded perspective view showing a socket, a shielding plate and a back cover.
Figure 4:
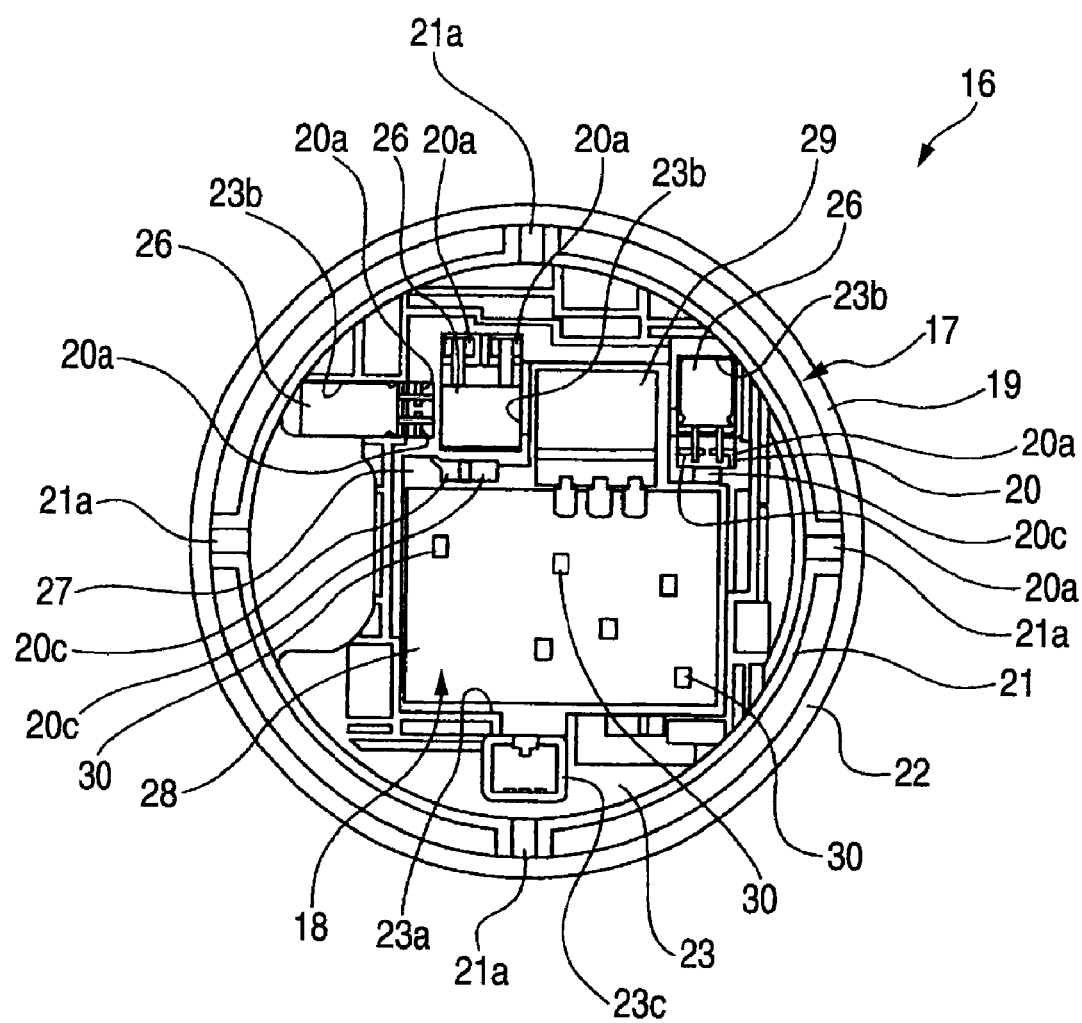
FIG. 4 is a front view of the back cover.
Figure 5:
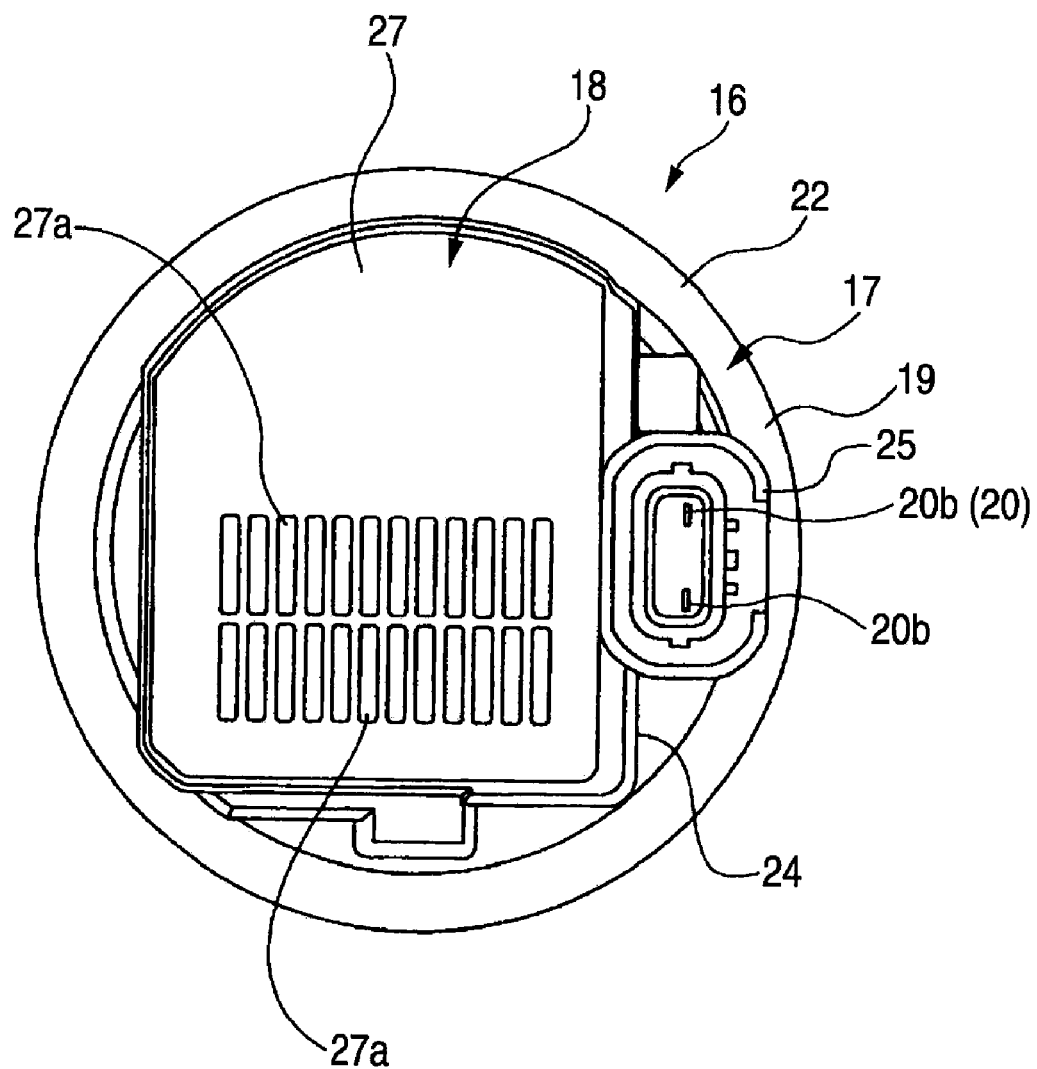
FIG. 5 is a rear view of the back cover.

A back cover 16 for closing the fitting opening 5*a* is fitted to the fitting portion 5 of the lamp body 2 (see FIG. 1 and FIG. 2). As shown in FIG. 3 to FIG. 5, the back cover 16 includes a cover body 17, and a radiator body 18 fitted to the cover body 17.

The cover body 17 is formed integrally by a cover main body 19 made of resin material, and connection terminals 20 made of metal material, in terms of the insert molding.

The cover main body 19 has a fitted portion 21 in a ring-like shape, a flange portion 22 extending outward from the rear end portion of the fitted portion 21, an inner structure portion 23 on the inside of the flange portion 22, a radiator body fitting portion 24 projecting backward from the rear surface of the inner structure portion 23, and a connector frame portion 25 at the side of the radiator body fitting portion 24 projecting backward from the rear surface of the inner structure portion 23.

Engaging projections 21*a* protruding outward are provided to the front end portion of the fitted portion 21.

An installing hole 23*a* that passes through longitudinally is formed in the inner structure portion 23 (see FIG. 3). Also, component inlaying portions 23*b*, 23*b*, 23*b* opened forward, respectively, and a connector connecting portion 23*c* are formed on the front surface of the inner structure portion 23. Electronic components 26, 26, 26, each constituting a lighting circuit (ballast) of the discharge lamp 9, are inlaid in and fixed to the component inlaying portions 23*b*.

As described above, as the connection terminals 20 are formed integrally with the cover main body 19 in terms of the insert molding, the terminals are embedded in the cover main body 19 (except a part of the terminals). Hence, a part of the connection terminals 20 protrudes outwardly from the cover main body 19 (see FIG. 4 to FIG. 6), so that there are provided component terminal portions 20*a* positioned in the inside of the component inlaying portions 23*b*, or connector terminal portions 20*b* positioned in the inside of the connector frame portion 25, or connecting terminal portions 20*c* protruding from the inner structure portion 23 to the installing hole 23*a* side. The component terminal portions 20*a* are connected to respective contacts of the electronic components 26 inlaid in the component inlaying portions 23*b* of the inner structure portion 23 respectively.

As shown in FIG. 3, the radiator body 18 has a heat radiating member 27 made of metal material, for example, and a radiating insulating substrate 28 arranged on the front surface of the heat radiating member 27 and made of ceramic material, for example.

Figure 6:
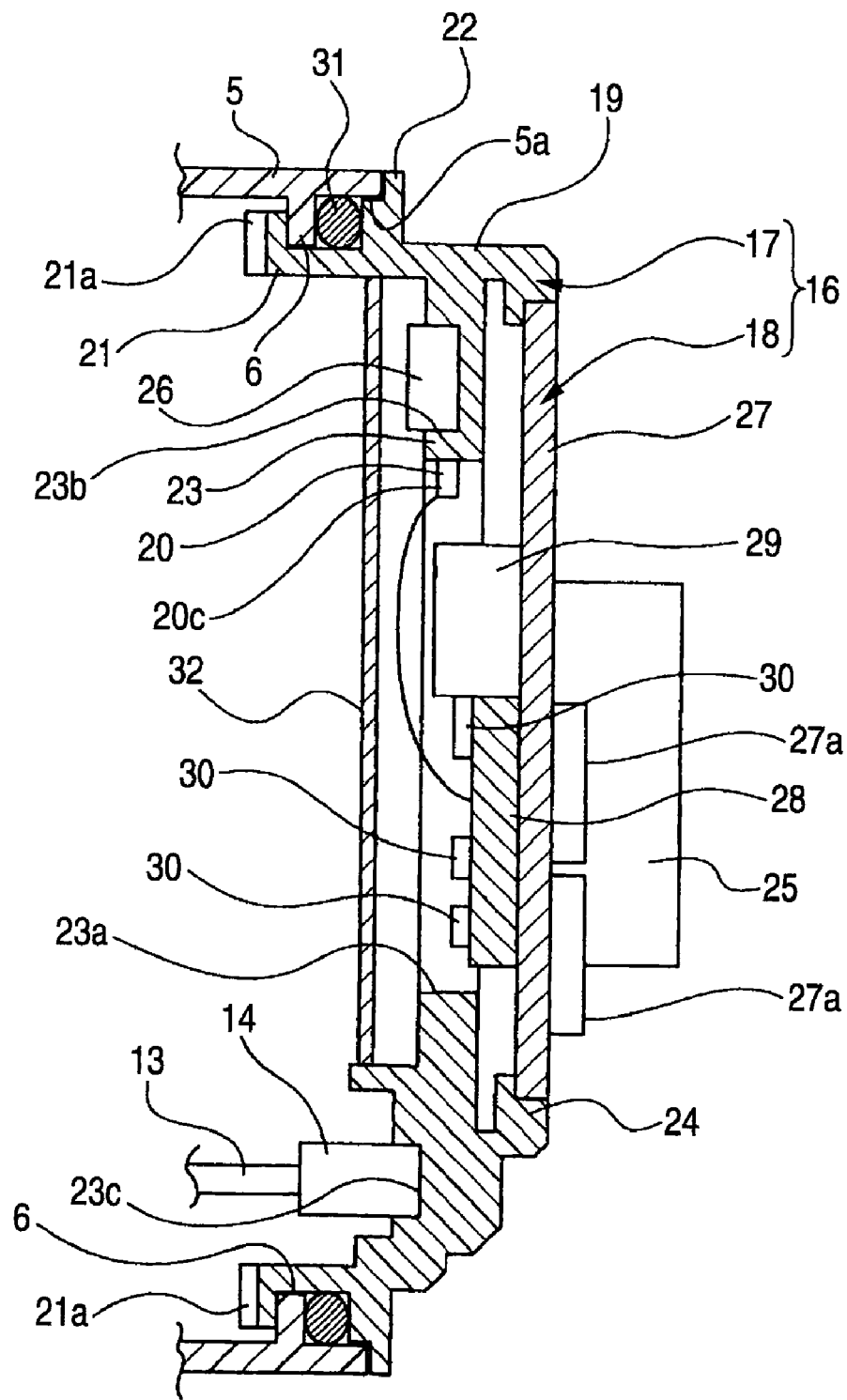
FIG. 6 is an enlarged sectional view showing a state that the back cover is fitted to the fitting portion of the lamp body.

Also, radiating fins 27*a* are provided for the heat radiating member 27 (see FIG. 5 and FIG. 6). As shown in FIG. 3 and FIG. 4, an electronic component (DC/DC converter) 29 constituting the lighting circuit is mounted on the front surface of the heat radiating member 27, and terminal portions of the electronic component 29 are connected to the radiating insulating substrate 28. The electronic component 29 produces a large amount of heat.

The radiating insulating substrate 28 is arranged in front of the radiating fins 27*a* of the heat radiating member 27 (see FIG. 6). Also, circuit patterns (not shown) are formed on the front surface of the radiating insulating substrate 28, and a plurality of electronic circuit components 30, constituting the lighting circuit, are mounted on the circuit patterns (see FIG. 3 and FIG. 4).

The radiator body 18 is fitted to the cover body 17 when the heat radiating member 27 is fitted into the radiator body fitting portion 24. Then its outer periphery is adhered to this member, for example. The back cover 16 is constructed when the radiator body 18 is fitted to the cover body 17.

When the radiator body 18 is fitted to the cover body 17, the radiating insulating substrate 28, the electronic component 29, and the electronic circuit components 30 are located in the installing hole 23*a* (see FIG. 6). As a result, an internal space of the back cover 16 can be used effectively, and the size of the vehicle lighting equipment 1 can be reduced by reducing the thickness of the back cover 16.

When the radiator body 18 is fitted to the cover body 17, the connecting terminal portions 20*c* of the connection terminals 20 are connected to the circuit patterns formed on the radiating insulating substrate 28 by the wire bonding or the metal ribbon respectively. Also the electronic components 26 inlaid in the component inlaying portions 23*b* are connected to the circuit patterns formed on the radiating insulating substrate 28 via the connection terminals 20.

An O ring 31 is fitted onto the outer peripheral surface of the fitted portion 21 (see FIG. 3 and FIG. 6). There is a possibility that the O ring 31 will come in contact with the engaging projections 21*a* protruding outward from the fitted portion 21. However, as the engaging projections 21*a* are formed, not of metal material, but of resin material, therefore, damage to the O ring 31 can be avoided even when the O ring 31 comes in contact with the engaging projections 21*a*.

A shielding plate 32 made of metal material is fitted to the front surface side of the cover body 17. Radiation from the lighting circuit is shielded by the shielding plate 32 and, thus, noise reduction can be attained.

After the O ring 31 and the shielding plate 32 are fitted, the cover body 17 is turned in the circumferential direction such that the engaging projections 21*a* are inserted between the engaging portions 6 from the back side. When the cover body 17 is turned, as shown in FIG. 6, the engaging projections 21*a* engage the front surface of the engaging portions 6. Then the back cover 16 is fitted to the fitting portion 5 of the lamp body 2. As a result, the O ring 31 tightly contacts the engaging portions 6 of the lamp body 2 and the flange portion 22 of the back cover 16.

In this manner, in the vehicle lighting unit 1, the back cover 16 can be constructed by providing the electronic components 26, the electronic component 29 and the electronic circuit components 30, as one unit and fitting the radiator body 18 to the cover body 17. Then this back cover 16 can be fitted to the lamp body 2. Therefore, assembling of respective portions of the vehicle lighting unit 1 can be facilitated.

Also, sealing between the back cover 16 and the fitting portion 5 of the lamp body 2 can be ensured by the O ring 31. Therefore, moisture (steam) contained in the outer air or moisture existing on the outer side can be prevented from entering into the lighting chamber 4. Also attaching/detaching of the back cover 16 can be accomplished easily in exchanging the discharge lamp 9.

When the cover body 17 is fitted to the fitting opening 5a of the lamp body 2, as shown in FIG. 3 and FIG. 6, the connector 14 is connected to the connector connecting portion 23c, and the starter 12a arranged in the inside of the socket 12 is connected to the lighting circuit of the discharge lamp 9 via the cable 13 and the connector 14.

Figure 7:
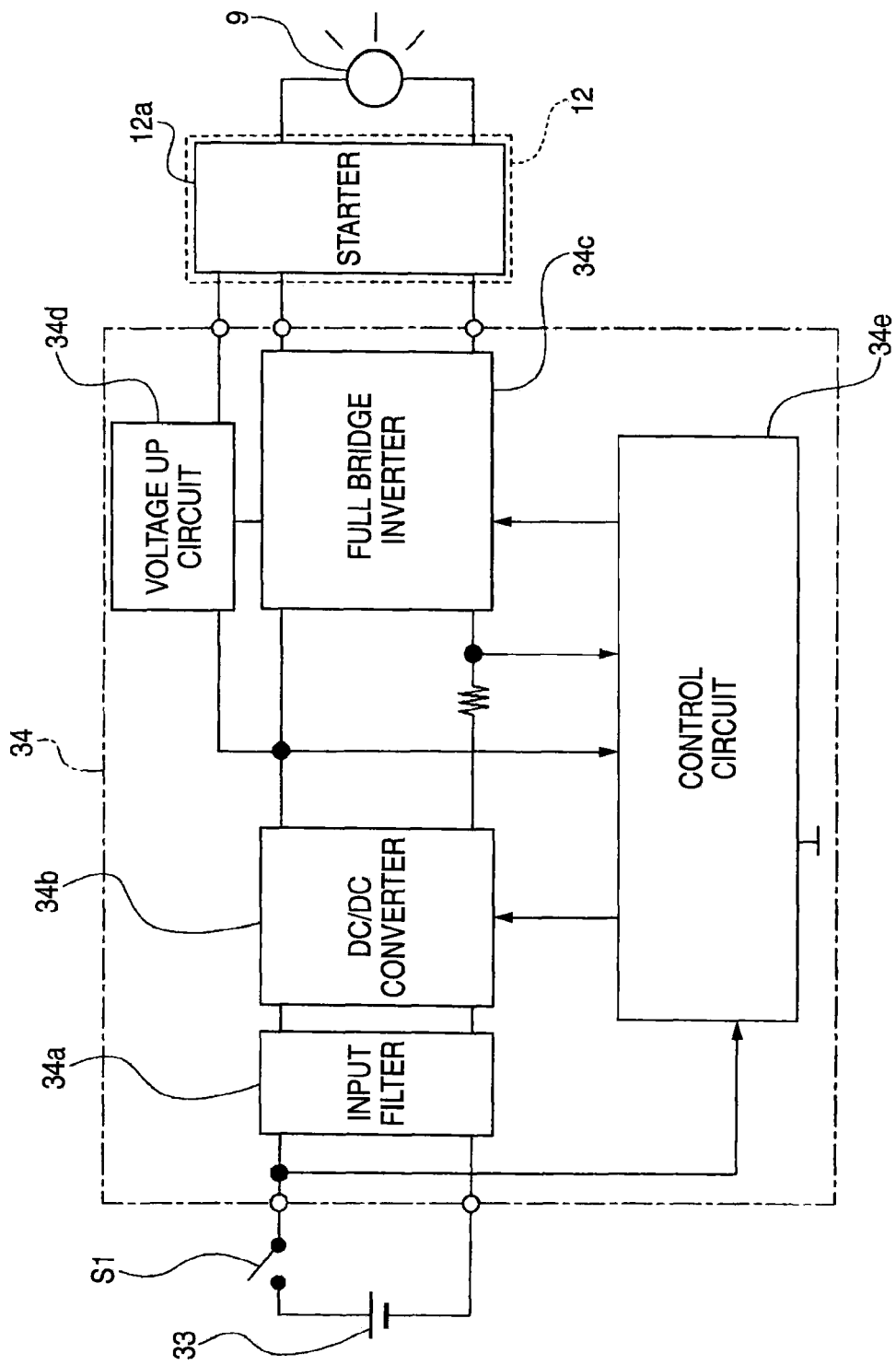
FIG. 7 is a block diagram showing a lighting circuit (ballast) of a discharge lamp.

An example of the lighting circuit (ballast) of the discharge lamp 9 is explained below (see FIG. 7).

An input filter 34a is connected from a DC power supply 33 via a switch S1. This input filter 34a suppresses noise generated by a ballast 34 and noise entering into the ballast 34.

A DC/DC converter 34b (corresponding to the electronic component 29) is connected to the input filter 34a as a DC-DC converter circuit. This DC/DC converter 34b receives a DC input voltage from the DC power supply 33 via the input filter 34a, and converts this voltage into a desired DC voltage.

In the DC/DC converter 34b, switching elements are driven by control signals from a control circuit 34e.

A full-bridge inverter 34c serves as a DC-AC converter circuit to convert an output voltage of the DC/DC converter 34b into an AC voltage (a rectangular wave) and then supplies the AC voltage to the discharge lamp 9. Although not shown, the full-bridge inverter 34c constitutes two arms by using four switching elements. For example, a driving circuit for driving the switching elements of each arm respectively is provided. Two pairs of switching elements are ON/OFF-controlled to generate an AC voltage. In the full-bridge inverter 34c, switching elements are driven by the control signals from the control circuit 34e.

A booster circuit 34d applies a step-up voltage to the starter 12a. The starter 12a generates a high-voltage pulse (e.g. about 25 kV) at the time of starting.

The control circuit 34e executes lighting control (transient/stable power control) of the discharge lamp 9. A fail-safe circuit for detecting an abnormality of input/output and controlling an operation stop is included in the control circuit 34e.

As set forth above, in the vehicle headlight 1, the cover body 17 of the back cover 16 is formed by molding integrally the connection terminals 20, a part of which is provided as the connector terminal portions 20b, 20b, and the cover main body 19. Therefore, the cover main body 19 and the connection terminals 20 buried in the cover main body 19 adhere tightly together. Moisture (steam) contained in the outer air or moisture existing on the outer side does not enter the lighting circuit and the lighting chamber 4 from the portion of the power supply connector. As a result, malfunctioning of the lighting circuit of the discharge lamp 9 can be prevented. Also, fogging of the front cover 3 can be prevented.

The cover body 17 is formed by molding integrally the connection terminals 20 and the cover main body 19. Therefore, the number of parts of the vehicle lighting unit 1 can be reduced.

Also, in the vehicle lighting unit 1, the electronic component 29 and the electronic circuit components 30 are mounted on the radiator body 18. Therefore, improvement of a heat radiation property of the electronic component 29 and the electronic circuit components 30 can be achieved.

In addition, the heat radiating member 27 of the radiator body 18 is fitted and secured to the radiator body fitting portion 24 of the cover body 17. Therefore, good adhesion between the cover body 17 and the radiator body 18 can be obtained and moisture from the back cover 16 can be prevented from entering the lighting chamber 4.

The radiator body 18 is constructed by the heat radiating member 27 and the radiating insulating substrate 28, and the electronic circuit components 30 are mounted on the radiating insulating substrate 28. Therefore, improvement of a heat radiation property of the electronic circuit components 30 can be achieved.

In the vehicle lighting equipment 1, the cover main body 19 is formed of resin material. The cover main body 19 may be formed by the so-called two-color molding using a conductive material and non-conductive material to construct a part of the cover main body 19 by the conductive material, whereby noise in the lighting circuit can be suppressed.

Also, in the foregoing discussion, an example is described in which the starter 12a is arranged on the discharge lamp 9 side (in the inside of the socket 12) in the lighting chamber 4. However, the arrangement position of the starter is not limited to this position. For example, the starter can be arranged on the lighting circuit side (for example, in the inside of the back cover 16).

All shapes and structures of respective portions given in the foregoing description are simply examples. Other shapes and structures can be used for other implementations. Accordingly, other implementations are within the scope of the claims.

What is claimed is:

1. A vehicle headlight comprising:

a discharge lamp as a light source in a lighting chamber comprising a lamp body, a fitting portion having a fitting opening on a rear end portion of the lamp body, and a front cover for covering a front side of the lamp body, and further comprising: a back cover including a cover main body fitted into the fitting portion of the lamp body and made of resin material, and connection terminals embedded in the cover main body except a part of the terminals and made of metal material, and in which the cover main body and the connection terminals are molded integrally, component inlaying portions for the cover main body, wherein electronic components that constitute a lighting circuit of the discharge lamp and are connected electrically to the connection terminals are inlaid in the component inlaying portions, wherein a part of the connection terminals protruding from the cover main body provides connector terminal portions of a power supply connector for supplying power to the discharge lamp and wherein the connection terminals made of the metal material are insert-molded in the cover main body made of the resin material;

a radiator body fitting portion in the cover main body and an installing hole passing through longitudinally, and a radiator body directly attached to electronic circuit components that constitute the lighting circuit, the electronic circuit components being arranged on a lighting chamber side, wherein the radiator body is fitted to the radiator body fitting portion to close the installing hole.

2. A vehicle headlight according to claim 1, wherein the radiator body includes a heat radiating member made of metal material, and a radiating insulating substrate fitted to one surface of the heat radiating member, and wherein the electronic circuit components connected electrically to the connection terminals are mounted on the radiating insulating substrate.

3. A vehicle headlight according to claim 1, further comprising:

engaging projections in the cover main body, an O ring interposed between the cover main body and the fitting portion of the lamp body and connected tightly to both members when the back cover is fitted to the lamp body, and wherein the back cover is arranged to be fitted to the lamp body by turning the cover main body in a direction that intersects orthogonally with an opening direction of the fitting opening so as to engage the engaging projections with engaging portions for the lamp body.

\* \* \* \* \*